(12) United States Patent
Jönsson et al.

(10) Patent No.: US 9,611,762 B2
(45) Date of Patent: Apr. 4, 2017

(54) POWER PLANT WITH CO2 CAPTURE AND METHOD TO OPERATE SUCH POWER PLANT

(75) Inventors: Staffan Jönsson, Baden (CH); Hongtao Li, Aarau (CH); Enrico Conte, Kuesnacht (CH)

(73) Assignee: General Electric Technology GmbH, Baden (CH)

(*) Notice: Subject to any disclaimer, the term of this patent is extended or adjusted under 35 U.S.C. 154(b) by 657 days.

(21) Appl. No.: 13/514,663

(22) PCT Filed: Nov. 29, 2010

(86) PCT No.: PCT/EP2010/068425
§ 371 (c)(1),
(2), (4) Date: Jan. 14, 2013

(87) PCT Pub. No.: WO2011/069857
PCT Pub. Date: Jun. 16, 2011

(65) Prior Publication Data
US 2013/0133326 A1    May 30, 2013

(30) Foreign Application Priority Data
Dec. 8, 2009  (EP) .................................. 09178397

(51) Int. Cl.
*F01K 17/00* (2006.01)
*F01K 17/04* (2006.01)
*F01K 23/06* (2006.01)

(52) U.S. Cl.
CPC ............ *F01K 17/04* (2013.01); *F01K 23/064* (2013.01)

(58) Field of Classification Search
CPC .............................. F01K 17/04; F01K 23/064
(Continued)

(56) References Cited

U.S. PATENT DOCUMENTS

| 4,528,811 A | 7/1985 | Stahl |
| 5,137,681 A | 8/1992 | Dougherty |

(Continued)

FOREIGN PATENT DOCUMENTS

| CA | 1295810 | 2/1992 |
| DE | 3616797 | 11/1987 |

(Continued)

*Primary Examiner* — Thomas Denion
*Assistant Examiner* — Kelsey Stanek
(74) *Attorney, Agent, or Firm* — GE Global Patent Operation; Cynthia W. Flanigan

(57) ABSTRACT

A fossil fuel fired power plant for the generation of electrical energy comprises a water steam cycle and a plant (10) for the capture of CO2 from exhaust gases emitted by the power plant and a steam jet ejector (24) configured and arranged to receive an input steam flow from a low- or intermediate pressure extraction point in the power plant and to increase its pressure. It is further arranged to receive motive steam (25) from a further extraction point in the power plant. A steam line (27, 22) directs the steam of increased pressure from the steam jet ejector (24) to the CO2 capture plant (10). The power plant according to this invention allows the use of low-pressure steam for the operation of the CO2 capture plant, where the extraction of such steam affects the overall efficiency of the power plant to a lesser degree than in power plant of the state of the art.

16 Claims, 5 Drawing Sheets

(58) Field of Classification Search
USPC .................................... 60/643–681; 423/220
See application file for complete search history.

(56) References Cited

U.S. PATENT DOCUMENTS

| | | | |
|---|---|---|---|
| 5,344,627 A * | 9/1994 | Fujii et al. .................... | 423/220 |
| 2004/0237528 A1* | 12/2004 | Nurmia ........................... | 60/671 |
| 2006/0248890 A1 | 11/2006 | Iijima et al. | |
| 2009/0094983 A1* | 4/2009 | Goto et al. ..................... | 60/676 |

FOREIGN PATENT DOCUMENTS

| | | |
|---|---|---|
| DE | 19535318 | 3/1997 |
| EP | 0551876 | 7/1993 |
| GB | 1 367 658 | 9/1974 |
| JP | 5-113105 | 5/1993 |
| JP | 2006213580 A * | 8/2006 |
| WO | 2008/090167 | 7/2008 |

* cited by examiner

POWER PLANT WITH CO2 CAPTURE AND METHOD TO OPERATE SUCH POWER PLANT

TECHNICAL FIELD

The present invention pertains to a fossil fuel fired power plant for the generation of electrical energy comprising a plant for the capture of carbon dioxide resulting from the combustion of the fossil fuels. It pertains in particular to an apparatus providing steam used for operating the carbon dioxide capture plant. It furthermore pertains to a method of operating such power plant.

BACKGROUND ART

Power plants for the generation of electrical energy based on the combustion of fossil fuels have been proposed to include plants for the capture of carbon dioxide ($CO_2$) produced in order to reduce the emission of this gas into the atmosphere known to significantly contribute to the green house effect. Most recently, the operation of such power plants has started in pilot projects.

Known carbon capture plants include a $CO_2$ absorber operating on the basis of chilled ammonia or amine processes and furthermore several $CO_2$ compressors in order to compress the captured $CO_2$, which would enable its storage and/or transport. These $CO_2$ capture and compression processes require energy in the form of heat and steam pressure. The absorption processes require a heat source for the regeneration of the absorption agent in a heat exchanger, and the $CO_2$ compression requires pressurized steam to drive turbines, which in turn drive compressors.

WO2008/090167 discloses a power plant with a $CO_2$ capture and compression plant, which provides steam to drive the turbines for the $CO_2$ compressors by extraction from a heat recovery steam generator HRSG. Further steam for this purpose is provided by the HRSG, where additional fuel is combusted in the HRSG. The low-pressure steam from the turbines driving the compressors is used for the regeneration of the absorption agent.

EP551876 discloses a power plant with $CO_2$ capture and compression plant comprising steam lines from the high-pressure steam turbine of the power generation plant leading to turbines to drive the compressors for the compression and cooling of the captured $CO_2$. Such use of high-pressure steam results however, in a reduction in efficiency of the power plant as a whole due to the loss of high-pressure steam in the turbines driving the generator.

SUMMARY OF INVENTION

It is an object of the invention to provide a power plant for the generation of electrical energy comprising a plant for the capture and compression of $CO_2$, where such plant has an increased efficiency as a whole and a higher degree of reliability of operation of the $CO_2$ capture plant compared to power plants of this type known in the prior art.

It is a further object of the invention to provide a method of operating a power plant of this type.

A fossil fuel fired power plant for the generation of electrical energy with a plant for the capture and compression of $CO_2$ from exhaust gases emitted by the power plant comprises, according to the invention, a steam jet ejector configured and arranged to receive via a steam line a steam flow from the water steam cycle as input steam and increase the pressure of the input steam and direct it via a further steam line to the $CO_2$ capture plant. The steam jet ejector is configured and arranged to receive a steam flow as a motive steam flow enabling the pressure increase of the input steam.

In an embodiment of the invention, the power plant comprises a steam line leading from a point in its water steam cycle at an extraction point at the intermediate-pressure steam turbine or downstream from the intermediate-pressure turbine directing low- or intermediate-pressure to the steam jet ejector.

In a first particular embodiment, the power plant comprises a steam line leading from a cross-over steam line between an intermediate-pressure steam turbine and a low-pressure steam turbine to the steam jet ejector. An output steam line directs the steam with increased pressure from the steam jet ejector to the $CO_2$ capture plant.

In a second particular embodiment of the invention, the power plant comprises a low-pressure steam line leading from an extraction point in the intermediate-pressure steam turbine to the steam jet ejector and a further a steam line from the steam jet ejector to the $CO_2$ capture plant.

In a third embodiment of the invention, the power plant comprises a low-pressure steam line leading from an extraction point in the low-pressure steam turbine to the steam jet ejector and a further steam line from the steam jet ejector to the $CO_2$ capture plant.

In a fourth embodiment of the invention, the power plant comprises a low-pressure steam line leading from an extraction point at the condenser to the steam jet ejector and a further steam line from the steam jet ejector to the $CO_2$ capture plant.

In each of the above embodiments of the invention, the power plant comprises a steam line leading steam as motive steam to the steam jet ejector. The motive steam is extracted from an extraction point at the intermediate-pressure steam turbine (provided it is upstream from the extraction point of the input steam) or any point upstream in the water steam cycle from that extraction point at the intermediate-pressure steam turbine. For example, motive steam line can lead from a reheat line leading from the high-pressure steam turbine to a boiler or heat recovery steam generator steam generator or from reheat steam lines leading from the boiler or heat recovery steam generator to the intermediate-pressure steam turbine. Motive steam can also be taken from the live steam line or from an extraction point at the high-pressure steam turbine. These lines contain a large flow of steam at a temperature and pressure just sufficient for motive steam. The extraction of a small amount of steam for motive steam from these steam lines has only a small impact on the steam flow in these lines, and the impact on the overall efficiency of the power plant therefore remains small as well.

The power plant according to the invention is equipped to direct low-pressure steam from the water-steam cycle of the power generation plant for the $CO_2$ capture and compression plant. The use of a low-pressure steam extraction instead of a high-pressure steam extraction has a smaller effect on the overall efficiency of the steam turbines in that the working steam flow is decreased to a lesser degree. Due to the steam jet ejector, the steam that is led to the $CO_2$ capture reaches the required pressure for operation of the $CO_2$ capture plant. In particular, the steam jet ejector provides the required steam pressure even when the low-pressure steam extracted from the water-steam cycle of the power plant is less than the required steam for operating the $CO_2$ capture plant. A sufficient steam pressure is therefore assured at all times and for all operation states of the power plant.

In particular, the power plant according to the invention allows the continued operation of the CO2 capture plant even when the power plant is operating at part-load, in a turn-down condition, or sliding pressure mode. During part-load operation the pressure of steam available from the water steam cycle is decreased and likely not sufficient for the operation of the CO2 capture plant. Here the arrangement of a steam jet ejector enables sufficient steam pressure for continued CO2 capture operation at all times of part-load operation.

In a further specific embodiment of the invention, the steam jet ejector is operatively connected to a heat exchanger for the regeneration of a CO2 absorption agent in the CO2 capture plant.

In a further specific embodiment of the invention, the CO2 capture plant operates on basis of chilled ammonia and the steam jet ejector is operatively connected to an apparatus for the stripping of ammonia from water.

In a further embodiment of the invention, the power plant comprises an additional steam line for low-pressure steam, which leads from the water steam cycle directly to the CO2 capture plant bypassing the steam jet ejector. Low-pressure steam is directed to the CO2 capture plant for its operation by means of this steam line in the case that the steam pressure sufficient for the operation of the CO2 capture plant, that is equal to or higher than the required steam pressure for the CO2 capture plant.

In a further embodiment of the invention, the power plant comprises an additional steam jet ejector (arranged in parallel to the first steam jet ejector and) configured and arranged to receive via a steam line low-pressure steam extracted from the water-steam cycle, increase the pressure of this input steam by means of a motive steam flow and to direct via a further steam line the steam with increased pressure to the CO2 capture plant. In order to avoid a significant loss in efficiency of the turbines, the steam extracted for the second steam jet ejector is extracted again from a point at the intermediate-pressure steam turbine or at a point in the water steam cycle downstream from the intermediate-pressure steam turbine. A motive steam line leads from a suitable point in the water steam cycle to the second steam jet ejector as described above.

The second steam jet ejector is activated in the case that the steam pressure increase by means of the first steam jet ejector does not provide sufficient pressure for the operation of the CO2 capture plant. The second steam jet ejector is configured and arranged to generate a greater pressure increase than the first steam jet ejector.

The second steam jet ejector can be arranged in parallel or in series with the first steam jet ejector.

A method to operate a power plant with a CO2 capture plant comprises extracting steam from the water steam cycle of the power plant at a point at an intermediate-pressure turbine or downstream from an intermediate-pressure turbine and directing it to a first steam jet ejector, increasing its pressure to a pressure equal or higher than the pressure required for the CO2 capture plant operation, directing this steam to the CO2 capture plant, and using it to operate within the CO2 capture plant. This can be for example to operate a heat exchanger for the regeneration of a CO2 absorption agent or a heat exchanger for an ammonia-water stripping apparatus. It is applicable when the pressure of the extracted steam is below the level of the required pressure for operating the CO2 capture plant. This can occur during full or part-load operation of the power plant.

A particular method to operate such power plant comprises, when operating the power plant within a range of full or part-load operation and operating the CO2 capture plant by extracting steam from the water steam cycle of the power plant and leading it directly to the CO2 capture plant through a line that bypasses the steam jet ejector. This is applicable, when during this range of full or part-load operation, the pressure of the extracted steam is equal to or more than the pressure required for the operation of the CO2 capture plant. If the pressure of the extracted steam drops below the pressure required to operate the CO2 capture plant, the method is adopted as described above. For this, the line leading steam directly to the CO2 capture plant is closed and a line for the extracted steam is opened directing it to the steam jet ejector for pressure increase.

A further particular method of operating the power plant is applied in addition to either one of the methods described above. When operating the power plant within a further part-load operation range, where the steam pressure generated by the steam jet ejector is below the pressure required for operating the CO2 capture plant, the line to the first steam jet ejector is closed and the steam extracted from the water steam cycle is directed to a second steam jet ejector. The second steam jet ejector increases the steam pressure at least to the level of the required steam pressure. The steam resulting from the second steam jet ejector is then directed to the CO2 capture plant.

These methods allow the operation of the CO2 capture plant at all times and during full-load as well as part-load operation of the power plant. For example, when the power plant is operating in a sliding pressure mode during turn-down of the plant and the pressure of steam that can be extracted from the water steam cycle decreases continuously. Depending on the pressure of the extracted steam relative to the required steam pressure to operate the CO2 capture plant, either no steam jet ejector, or the first, or the second steam jet ejector is put into operation by respectively opening or closing the bypass line, or the steam lines leading to the individual ejectors.

BEST MODES FOR CARRYING OUT THE INVENTION

Figure 1:
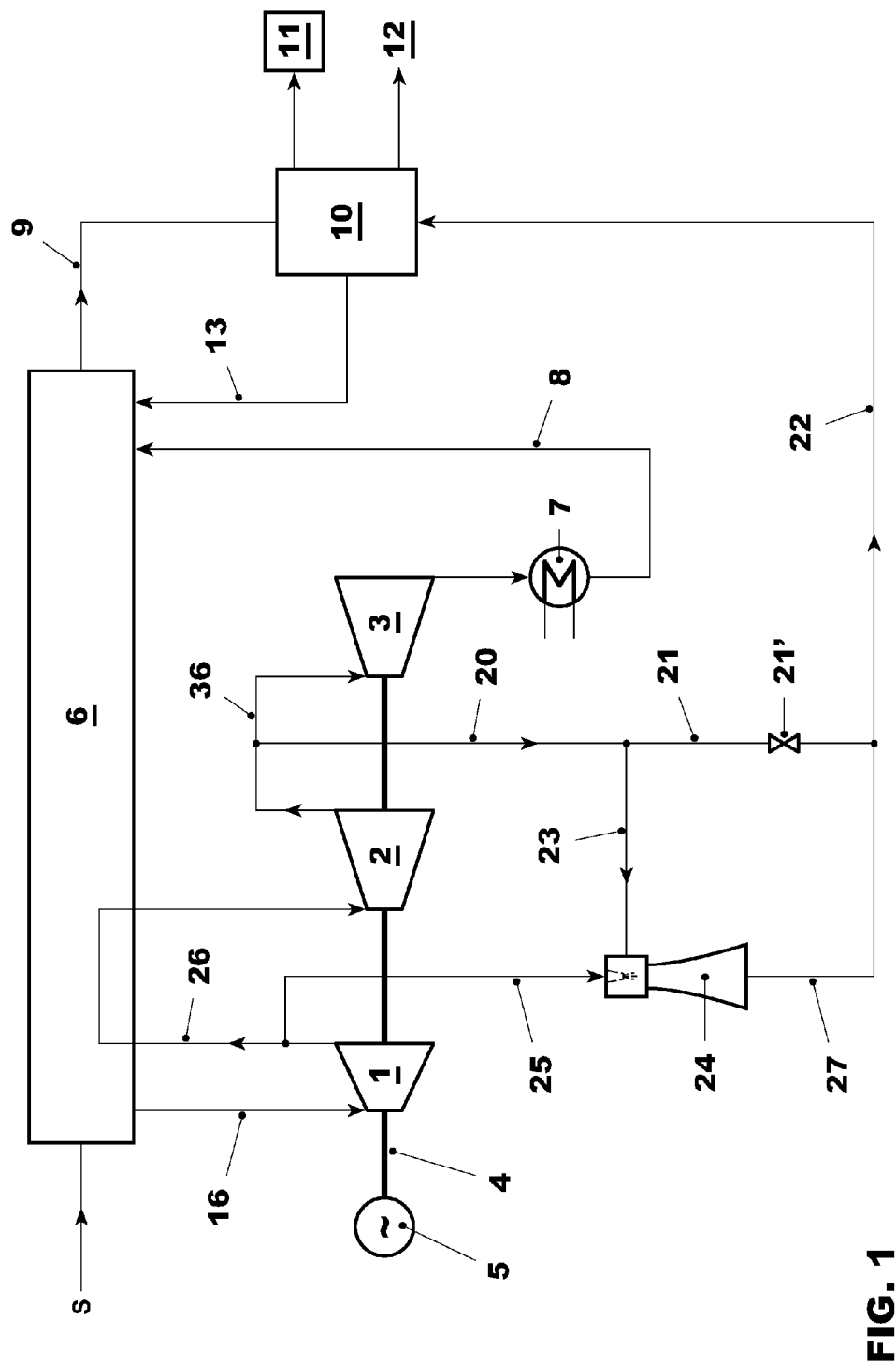
FIG. 1 shows a schematic view of a first embodiment of a power plant according to the invention with a steam jet ejector.
Figure 2:
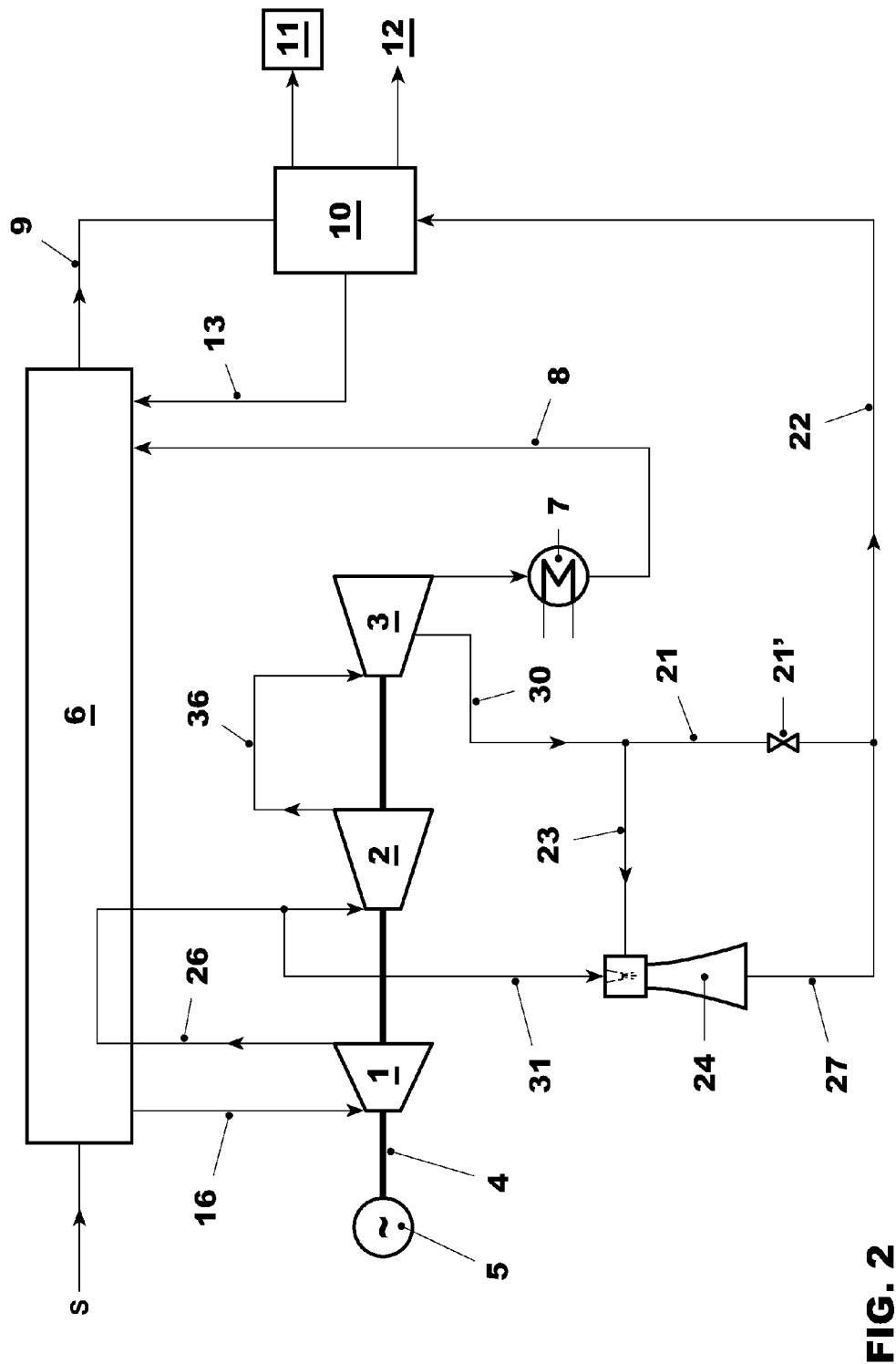
FIG. 2 shows a schematic view of a second embodiment of a power plant according to the invention with a steam jet ejector.
Figure 3:
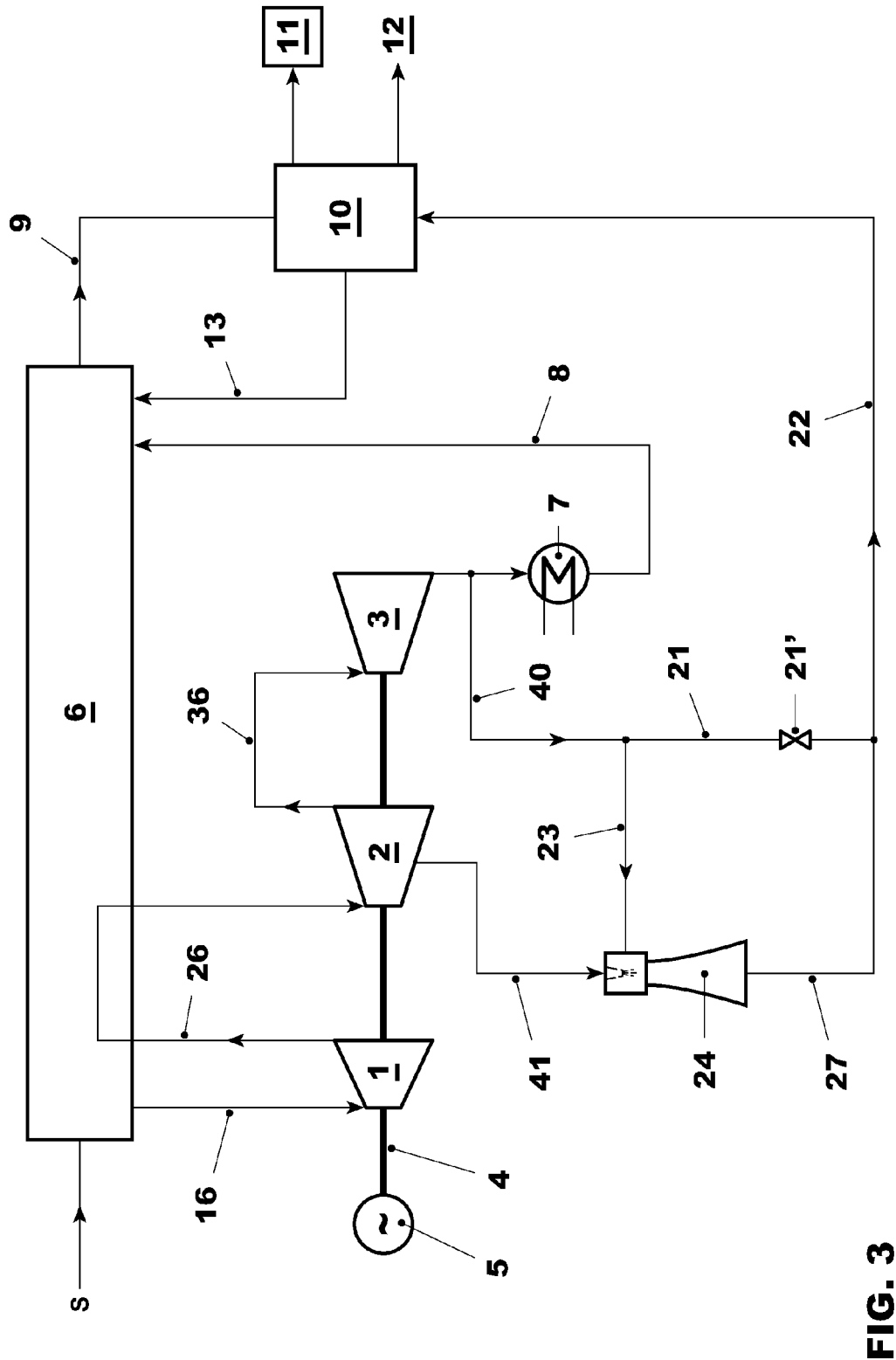
FIG. 3 shows a schematic view of a third embodiment of a power plant according to the invention with a steam jet ejector.

FIGS. 1-3 each show a power plant according to the invention having steam turbines 1, 2, and 3 driven by high-, intermediate-, and low-pressure steam respectively. The steam turbines are arranged on a common shaft 4 to drive a generator 5 for the generation of electrical energy. The steam for the turbines is generated by a boiler fired by a fossil fuel or a steam generator such as a heat recovery steam generator HRSG 6 operated by means of the hot exhaust gases from a gas turbine S. The live steam is fed via a line 16 to the high-pressure steam turbine 1. The steam turbines 1, 2, and 3 are connected via reheat and cross-over steam lines 26 and 36, respectively. The water steam cycle of the power plant of FIGS. 1-3 is completed by a condenser 7, which condenses the steam exhausted by the low-pressure steam turbine 3, specified apparatuses (not shown) for the reheating and degassing of the condensate and feedwater a return line 8 leading to the boiler or HRSG 6.

The power plant of FIGS. 1-3 each comprises furthermore a line for the exhaust gases from the boiler or from the HRSG 6 leading to a plant 10 for the capture and compression of $CO_2$. This plant comprises for example an absorber operating on the basis of chilled ammonia or amine processes and one or several $CO_2$ compressors in order to compress the $CO_2$ extracted from the exhaust gases. The captured and compressed $CO_2$ is transported to a storage or transport facility by means of line 11. Gases free of the $CO_2$ are released to the atmosphere or directed via line 12 to further separation or processing. A line 13 is provided for return condensate from the capture processes to be directed as feedwater to the HRSG or boiler 6.

According to the invention, a steam jet ejector 24 is arranged in the power plant to receive a low-pressure input steam flow via a steam line 20 and 23 and a flow of motive steam via a steam line 25 in order to generate an output steam flow of a higher pressure than that of the input steam flow. An output steam line 27 is arranged to direct the output steam from the steam jet ejector 24 to a steam line 22 leading to the $CO_2$ capture plant. The steam is used in the $CO_2$ capture plant to drive turbines to drive $CO_2$ compressors or as heat exchange medium for the regeneration of the $CO_2$ capture agent.

The line 20 is arranged to divert steam from the cross-over line from the intermediate-pressure steam turbine 2 to the low-pressure steam turbine 3 and lead the extracted steam to steam 23 to the steam jet ejector 24. The steam line 25 leads steam extracted from the reheat steam line 26 between the high-pressure steam turbine 1 and the HRSG 6.

This configuration allows high-pressure steam to be directed to the $CO_2$ capture plant without having to extract steam from a high-pressure steam source in the water-steam cycle of the power plant thereby not adversely affecting its overall efficiency.

An additional steam line 21 leads from the steam line 20 directly to steam line 22 leading to the $CO_2$ capture plant and having a non-return valve 21'. This line and valve allow the direction of low-pressure steam directly to the $CO_2$ capture plant in the case when the pressure of the steam provided by the water steam cycle is sufficient for the operation of the $CO_2$ capture plant.

FIG. 2 shows a further embodiment of the invention where the steam jet ejector is arranged to receive an input steam flow extracted from the low-pressure steam turbine 3 via a line 30 and line 23. The motive steam for the steam jet ejector 24 is, in this embodiment, extracted via line 31 from the reheat line 26 between the HRSG 6 and the intermediate-pressure steam turbine 2.

As in the embodiment of FIG. 1, the power plant includes a steam line 21 and non-return valve 21' to allow low-pressure steam to be directed directly without steam pressure enhancement to the $CO_2$ capture plant in case the pressure of the steam from the water steam cycle is sufficient for its operation.

FIG. 3 shows a further embodiment of the invention comprising a steam jet ejector 24 arranged to receive as input steam a portion of the low-pressure turbine exhaust steam. An input steam line 40 leads from an extraction point between the low-pressure steam turbine 3 and the condenser 7 to steam line 23 leading to the steam jet ejector. A line for motive steam 41 leads from an extraction point at the intermediate pressure steam turbine 2 to the steam jet ejector 24.

A line 21 leads from line 40 directly via a non-return valve 21' to the steam line 22 to allow for low-pressure steam to be used from the water steam cycle directly in the $CO_2$ capture plant if the pressure of the extracted steam flow is sufficient to operate the $CO_2$ capture plant.

Figure 4:
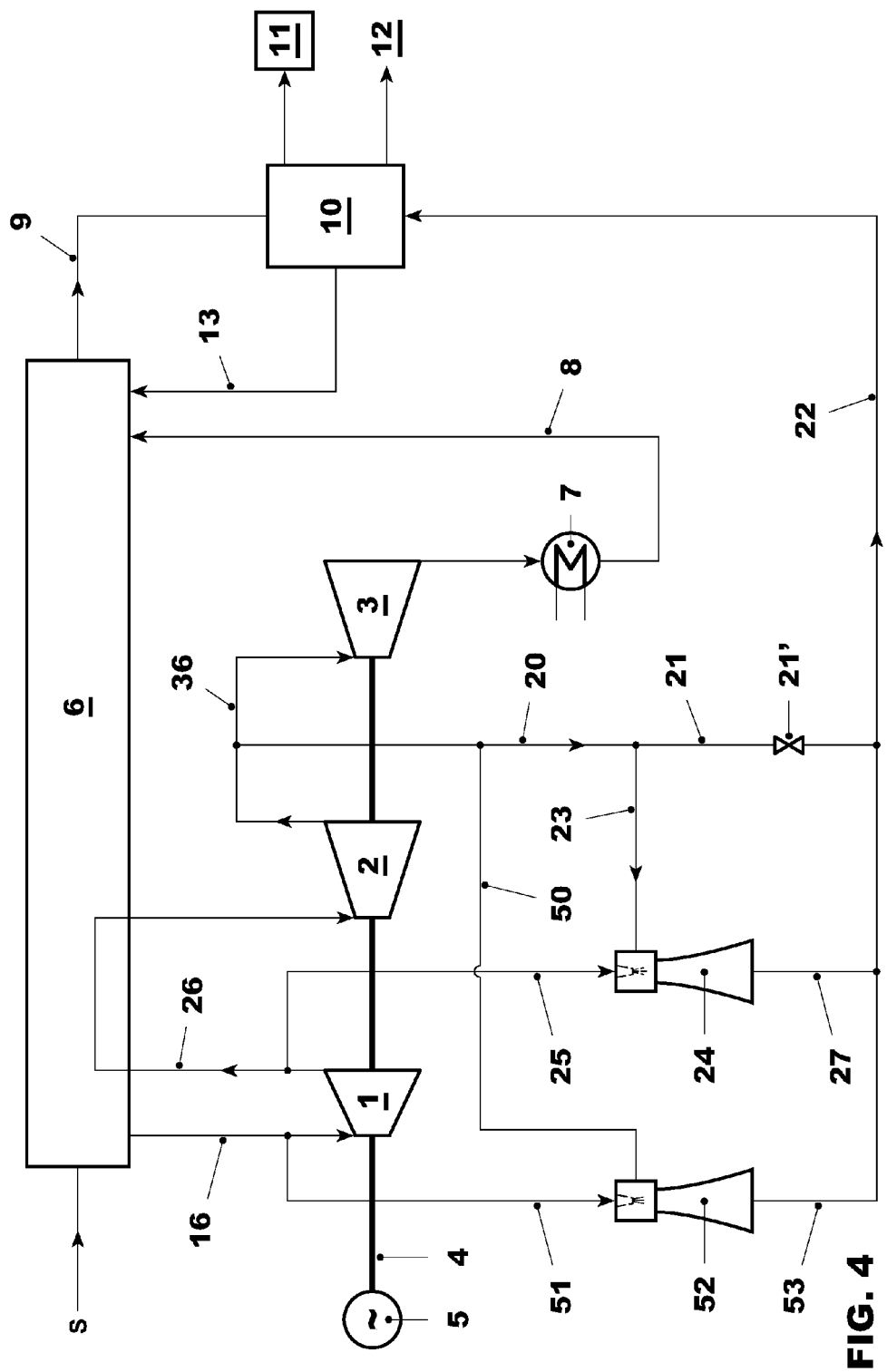
FIG. 4 shows a schematic view of further embodiment of a power plant according to the invention with an additional steam jet ejector.

FIG. 4 shows a power plant having, in addition to the steam jet ejector of the power plant of FIG. 1, a further steam jet ejector 52 arranged in parallel to the ejector 24. A steam line 50 leads from the extraction line 20 from the cross-over line 36 to direct input steam to the steam jet ejector 52. A motive steam line 51 directs a portion of live steam from line 16 to the steam jet ejector 52. Other motive steam lines to the steam jet ejector 52 are possible as they are illustrated in the previous figures. Steam with increased pressure resulting from ejector 52 is directed via line 53, 27 and 22 to the $CO_2$ capture plant 10. The steam jet ejector 52 is activated for example in the case that the steam resulting from steam jet ejector 24 no longer fulfills the steam pressure requirement for the $CO_2$ capture plant. For example, during a turn-down operation the part-load decreases and the pressure of steam resulting from steam jet ejector 24 eventually drops below the steam pressure required for the $CO_2$ capture plant. In such case, the line 23 to the steam jet ejector 24 is closed off and line 50 is opened instead.

Figure 5:
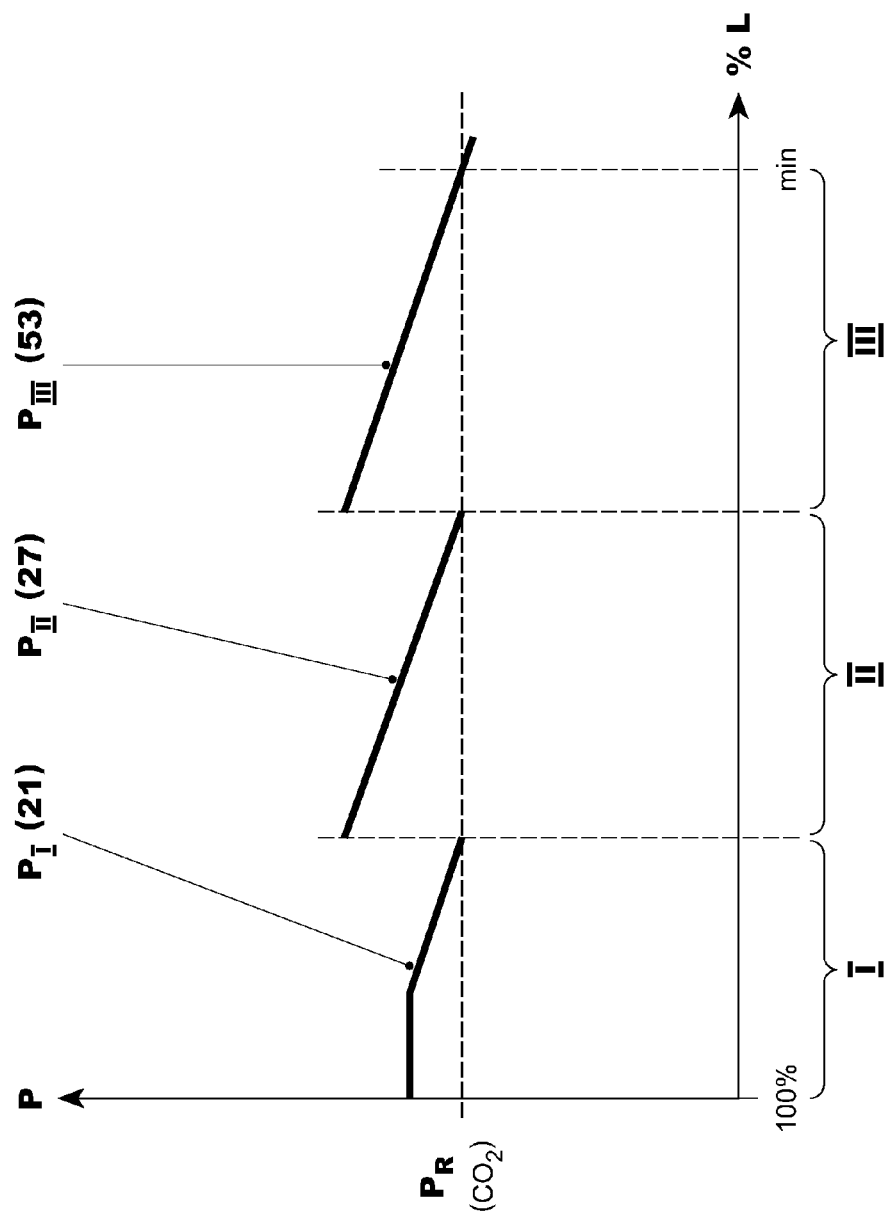
FIG. 5 shows a plot illustrating the steam pressure provided to the CO2 capture plant by operating two steam jet ejectors.

FIG. 5 illustrates a method of operating a power plant with $CO_2$ capture plant as shown in FIG. 4. The pressure P of steam provided to the $CO_2$ capture plant is given as a function of percentage part load operation of the power plant. The minimum required pressure in order to effectively operate the $CO_2$ capture plant is given by the broken line at the value of $P_R(CO2)$. Independent of the operation mode of the power plant itself, this pressure requirement remains the same throughout all part-load operation modes.

In a first range of operation I, the power plant is operating at full load or a high percentage part load. Within this range, the pressure of the extracted steam $P_{I(21)}$ is higher than the required steam pressure to operate the $CO_2$ capture plant. In this range I, for example 80-100% of full load, the bypass valve 21' is open and the extracted steam can be used directly to operate the $CO_2$ capture plant. No pressure increase is necessary. When the percentage part-load decreases, for example during a turn-down of the power plant, the pressure of the extracted steam decreases as well, and it eventually reaches the level of the minimum required pressure for the $CO_2$ capture plant operation $P_R(CO2)$. (If the power plant were now further turned down without the activation of a steam jet ejector 24, the pressure of the extracted steam would continue to drop steadily at the same rate as shown by $P_{I(21)}$.)

As of the point, where the extracted steam pressure $P_{I(21)}$ reaches $P_R(CO2)$, the power plant is operating in a part-load operation range II. According to the invention, the bypass valve 21' is closed and steam extracted from the water steam cycle is directed via steam line 23 to the first steam jet ejector 24. The steam pressure is increased to a level $P_{II(27)}$ above the required pressure level $P_R(CO2)$ and is directed via line 27 to the $CO_2$ capture plant. $P_{II(27)}$ is the pressure resulting from the extracted steam pressure without steam ejectors, which would be below $P_R(CO2)$ and the motive steam pressure in line 25, which is at a level above $P_{II(27)}$.

As the part-load of the power plant is further decreased within the part-load range II, for example 60-80% of full load, the pressure of the extracted steam $P_{II(27)}$ in line 27 again decreases. The pressure of the steam resulting from the steam jet ejector 24 decreases as well and eventually reaches the level of the required steam pressure $P_R(CO2)$. (Again, if the second steam jet ejector 52 were not activated, the steam pressure to the CO2 capture plant would continue to drop at the rate shown in $P_{II(27)}$). As of this point, the power plant is operating in the part-load range III. According to the invention, the line 23 to the steam jet ejector 24 is closed and the line 50 to the second steam jet ejector 52 is opened. During the operation within part-load range III, for example 40-60% of full load, the steam ejector 24 increases the pressure of the steam to the CO2 capture plant to a level $P_{III(53)}$ above the required $P_R(CO2)$ assuring operation of the CO2 capture plant. Extracted steam pressure $P_{III(53)}$ again results from the extracted steam pressure without any steam jet ejector, which would be well below $P_R(CO2)$ and the motive steam pressure in line 51, which is well above $P_{III(53)}$.

Further embodiments of the invention, in particular, further combinations of input steam lines to the steam jet ejector and motive steam lines, are possible within the scope of this disclosure.

TERMS USED IN FIGURES 1 high-pressure steam turbine
2 intermediate-pressure steam turbine
3 low-pressure steam turbine
4 shaft
5 generator
6 boiler or heat recovery steam generator HRSG
7 condenser
8 condensate/feedwater line
9 line for exhaust gases
10 CO2 capture and compression plant
11 CO2 storage or transport facility
12 CO2 free gases
13 line for return condensate
16 line for live steam to high-pressure steam turbine
20 line for input steam flow to steam jet ejector
21 line for low-pressure steam to CO2 capture plant
21' non-return valve
23 line for input steam flow to steam jet ejector 24
22 steam line to CO2 capture plant
24 steam jet ejector
25 line for motive steam
26 reheat line
30 line for input steam flow to steam jet ejector 24
31 line for motive steam
40 line for input steam flow to steam jet ejector 24
41 line for motive steam
50 extraction steam line, input steam line to steam jet ejector 52
51 motive steam line
52 second steam jet ejector
53 steam line to CO2 capture plant

The invention claimed is:

1. A fossil fuel fired power plant for the generation of electrical energy having a water steam cycle and a plant for the capture of CO2 from exhaust gases emitted by the power plant; the power plant comprising;
  a steam jet ejector configured and arranged between the water steam cycle and the CO2 capture plant to receive an input steam flow extracted from the water steam cycle of the power plant via a steam line for an input steam flow, and to receive a motive steam flow extracted from the water steam cycle via a steam line for motive steam flow, wherein the steam jet ejector is configured to increase the pressure of the input steam flow to a pressure equal to or higher than a pressure required for the CO2 capture plant operation; and
  a line for an output steam flow leading from the steam jet ejector to the CO2 capture plant.

2. The fossil fuel fired power plant according to claim 1, wherein
  the steam line for the input steam flow leads from an extraction point at an intermediate-pressure steam turbine of the power plant or from a point in the water steam cycle downstream from the extraction point at the intermediate-pressure steam turbine.

3. The fossil fuel fired power plant according to claim 1, wherein
  the power plant further comprises a steam line for input steam flow leading from a cross-over line between an intermediate-pressure steam turbine and a low-pressure steam turbine to the steam jet ejector.

4. The fossil fuel fired power plant according to claim 1, wherein
  the power plant further comprises a steam line for input steam flow leading from a low-pressure steam turbine to the steam jet ejector.

5. The fossil fuel fired power plant according to claim 1, wherein
  the power plant further comprises a steam line for input steam flow leading from an exhaust steam line between a low-pressure steam turbine and a condenser to the steam jet ejector.

6. The fossil fuel fired power plant according to claim 1, wherein
  the power plant further comprises a steam line for motive steam flow leading from a reheat line between a high-pressure steam turbine and an intermediate-pressure steam turbine to the steam jet ejector.

7. The fossil fuel fired power plant according to claim 6, wherein
  the motive steam flow is extracted at a point between the high-pressure steam turbine and a boiler or a heat recovery steam generator.

8. The fossil fuel fired power plant according to claim 6, wherein
  the motive steam flow is extracted at a point between a boiler or a heat recovery steam generator and the intermediate-pressure steam turbine.

9. The fossil fuel fired power plant according to claim 1, wherein
  the power plant comprises a steam line for motive steam flow leading from an intermediate-pressure steam turbine to the steam jet ejector.

10. The fossil fuel fired power plant according to claim 1, wherein
  the power plant further comprises a bypass steam line leading from a line for input steam flow to a line directing the steam directly to the CO2 capture plant.

11. The fossil fuel fired power plant according to claim 10, wherein
  the bypass steam line comprises a non-return valve.

12. A fossil fuel fired power plant for the generation of electrical energy having a water steam cycle and a plant for the capture of CO2 from exhaust gases emitted by the power plant; the power plant comprising;

a steam jet ejector configured and arranged to receive an input steam flow extracted from the water steam cycle of the power plant via a steam line for an input steam flow, and to receive a motive steam flow extracted from the water steam cycle via a steam line for motive steam flow, wherein the steam jet ejector is configured to increase the pressure of the input steam flow;

a line for an output steam flow leading from the steam jet ejector to the CO2 capture plant; and a further steam jet ejector configured and arranged to receive via a line input steam from an extraction point in the water steam cycle, to receive a motive steam flow extracted from the water steam cycle, to increase the pressure of the input steam flow and to direct via a line an output steam flow to the CO2 capture plant.

13. The fossil fuel fired power plant according to claim 12, wherein the power plant further comprises a line for motive steam flow for one or both of the steam jet ejectors which leads from a live steam line between a boiler or a heat recovery steam generator to a high-pressure steam turbine or from the high-pressure steam turbine to one or both of the steam jet ejectors.

14. A method of operating a power plant, the method comprising:

when operating the power plant within a full or part-load range, extracting steam from a water steam cycle of the power plant at an intermediate-pressure turbine or at a point downstream of the intermediate-pressure turbine and directing the extracted steam from the water steam cycle of the power plant to a first steam jet ejector arranged between the water steam cycle and a CO2 capture plant, increasing pressure of the extracted steam to a pressure equal to or higher than a pressure required for the CO2 capture plant operation $P_R(CO2)$, directing the steam resulting from the steam jet ejector to the CO2 capture plant, and using it to operate the CO2 capture plant.

15. The method of operating a power plant according to claim 14, wherein if the pressure of the extracted steam is equal to or higher than the steam pressure $P_R(CO2)$ required to operate the CO2 capture plant, leading the extracted steam directly to the CO2 capture plant via a line that bypasses the steam jet ejector to operate the CO2 capture plant.

16. A method of operating a power plant, the method comprising:

when operating the power plant within a full or part-load range, extracting steam from a water steam cycle of the power plant at an intermediate-pressure turbine or at a point downstream of the intermediate-pressure turbine and directing it to a first steam jet ejector, increasing its pressure to a pressure equal to or higher than a pressure required for a CO2 capture plant operation $P_R(CO2)$, directing the steam resulting from the steam jet ejector to the CO2 capture plant, and using it to operate the CO2 capture plant; and when operating the power plant within a part-load range, where the steam pressure generated by the first steam jet ejector is below the pressure required $P_R(CO2)$ for operating the CO2 capture plant, closing a line for extracted steam flow from the water steam cycle to the first steam jet ejector and directing the extracted steam flow to a second steam jet ejector, increasing the pressure of the extracted steam, and directing it to the CO2 capture plant.

* * * * *